USO10602042B2

(12) United States Patent
Wei

(10) Patent No.: US 10,602,042 B2
(45) Date of Patent: Mar. 24, 2020

(54) IMAGING CAMERA

(71) Applicant: AAC Technologies Pte. Ltd., Singapore (SG)

(72) Inventor: Chuandong Wei, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/236,308

(22) Filed: Dec. 28, 2018

(65) Prior Publication Data
US 2019/0253588 A1 Aug. 15, 2019

(30) Foreign Application Priority Data

Feb. 9, 2018 (CN) .................. 2018 2 0249592 U

(51) Int. Cl.
H04N 5/225 (2006.01)
(52) U.S. Cl.
CPC ......... H04N 5/2254 (2013.01); H04N 5/2252 (2013.01)
(58) Field of Classification Search
CPC .................. H04N 5/2254; H04N 5/2252
See application file for complete search history.

(56) References Cited

U.S. PATENT DOCUMENTS

| 2005/0141106 A1* | 6/2005 | Lee ............... G02B 7/023 359/808 |
| 2006/0165406 A1* | 7/2006 | Makii ............ G02B 7/026 396/349 |
| 2007/0077051 A1* | 4/2007 | Toor ............. G03B 17/28 396/144 |
| 2009/0219433 A1* | 9/2009 | Higuchi ......... G02B 7/025 348/340 |
| 2012/0069165 A1* | 3/2012 | Choi ............. H04N 1/00413 348/61 |
| 2012/0288272 A1* | 11/2012 | Pavithran ....... G03B 17/12 396/529 |
| 2015/0205186 A1* | 7/2015 | Park ............. G03B 17/08 348/373 |
| 2016/0062110 A1* | 3/2016 | Kashima ........ G02B 7/021 359/513 |

* cited by examiner

Primary Examiner — Lin Ye
Assistant Examiner — John H Morehead, III
(74) Attorney, Agent, or Firm — IPro, PLLC; Na Xu

(57) ABSTRACT

The present application discloses an imaging camera, including: a housing with an accommodation space and including a supporting part extending toward the accommodation space; a lens holder received in the accommodation space of the housing; a lens unit received in the lens holder; and a damping layer located at an image side of the lens holder. The supporting part is located at the image side of the lens holder, and the lens holder abuts against the supporting part via the damping layer.

9 Claims, 2 Drawing Sheets

IMAGING CAMERA

FIELD OF THE PRESENT DISCLOSURE

The present disclosure relates to the field of image capturing, and more particularly to an imaging camera.

DESCRIPTION OF RELATED ART

With development of technology, besides digital cameras, more and more portable electronic devices are equipped with image capturing functions. To achieve the image capturing function, a camera module is needed. Generally, a camera module includes a camera lens for collecting light reflected from an object, a sensor for receiving the light and converting the light to electrical signals, and processor for calculating the signals and outputting digital images.

A related imaging camera generally includes a lens holder and a plurality of lens units accommodated in the lens holder. For positioning the lens holder, the imaging camera further provides a housing for accommodating and fastening the lens holder. Generally, the lens holder is fastened in the housing by threads or by restrictive structures. However, The threads or restrictive structures cannot stably position the lens holder, and the lens holder would be movable along the optical axis, which badly affects the image quality of the imaging camera.

Therefore, it is desired that an improved imaging camera can be developed to overcome the disadvantages mentioned above.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby are only to explain the disclosure, not intended to limit the disclosure.

Figure 1:
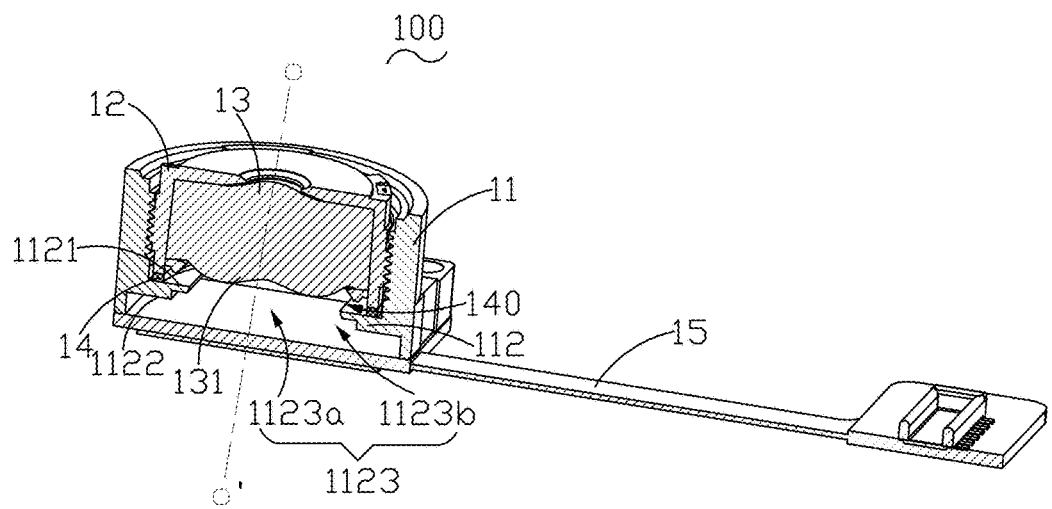
FIG. 1 is an illustrative isometric view of an imaging camera in accordance with a first exemplary embodiment of the present invention, wherein half of the imaging camera is removed for clearly understanding the structure therein.
Figure 2:
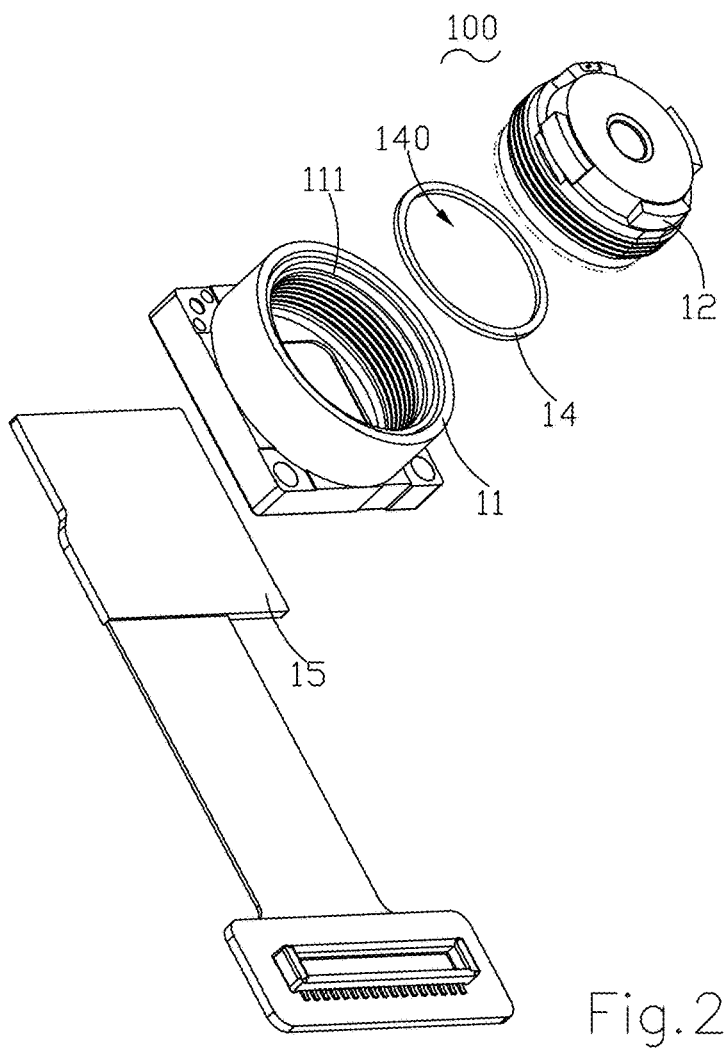
FIG. 2 is an exploded view of the imaging camera in FIG. 1.

Referring to FIGS. 1-2, an imaging camera 100 in accordance with a first exemplary embodiment of the present invention includes a housing 11, a lens holder 12 and a lens unit 13. The housing 11 forms an accommodation space 110 for accommodating the lens holder 12. The lens unit 13 is received in the lens holder 12. The housing 11 includes a supporting part 112 extending toward inside the accommodation space 110, and the supporting part 112 locates at an image side of the lens holder 12. The imaging camera 100 further includes a damping layer 14 located at the image side of the lens holder 12, and the lens holder 12 abuts against the supporting part 112 via the damping layer 14.

By virtue of the damping layer 14, the lens holder 12 can connect to the supporting part via the damping layer 14. And the damping layer 14 can apply a counter-acting force to the lens holder 14 along a direction toward the object side, by which the lens holder 12 can be restricted in the housing 11 and stability of the imaging camera 100 is accordingly improved.

In addition, the lens holder 12 is lifted by the damping layer 14 and the last lens unit in the lens holder 12 will accordingly not contact the supporting part 112 directly, and possible abrasion between the lens holder and the supporting part 112 is avoided.

In detail, the supporting part 112 extends from an inner sidewall 111 of the housing 11 toward the optical axis OO'. As an improvement, the supporting part 112 extends from the inner sidewall 111 of the housing toward and perpendicularly to the optical axis OO', by virtue of which, the supporting part 112 provides a stable force to the damping layer 14 for positioning the damping layer on the supporting part 112.

The supporting part 112 includes an object side surface 1121 adjacent to the object side and an image side surface 1122 adjacent to the image side. The object side surface 1121 forms a shoulder hole 1123, and the damping layer 14 abuts against the object side surface 1121. Optionally, the shoulder hole 1123 includes a first hole 1123a and a second hole 1123b. A diameter of the first hole 1123a is smaller than a diameter of the second hole 1123b.

It should be noted that the damping layer 14 forms an aperture 140 facing the lens unit 13, and a diameter of the aperture is greater than the diameter of the first hole 1123a. Because the diameter of the first hole 1123a is smaller than the diameter of the aperture 140, the incident light can go through the first hole with little stray light.

In this embodiment, the damping layer 14 is a ring-shape for letting the incident light entering the imaging camera. Further, in this embodiment, the damping layer 14 is made of porous sponge with black coating. Thus the damping layer 14 can provide elastic force to the lens holder 12. The black coating can adsorb the stray light reflected by the housing 11. The damping layer 14 is assembled with the lens holder and the housing by adhesive. The damping layer 14 respectively contacts the image side of the lens holder 12 and the supporting part 112 of the housing 11.

In this embodiment, the lens holder 12 is assembled with the housing 11 by threads. The lens holder 12 is provided with outer threads, and the housing 11 is provided with inner threads.

In fact, the imaging camera 100 further includes a circuit board 15 mounted on the image side of the housing 11 and abutting against the housing 11.

Figure 3:
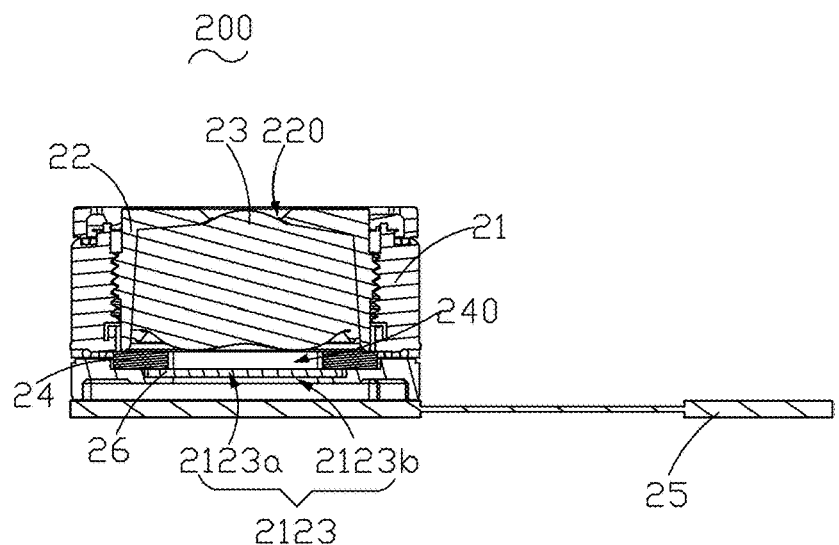
FIG. 3 is an illustrative isometric view of an imaging camera in accordance with a second exemplary embodiment of the present invention, wherein half of the imaging camera is removed for clearly understanding the structure therein.
Figure 4:
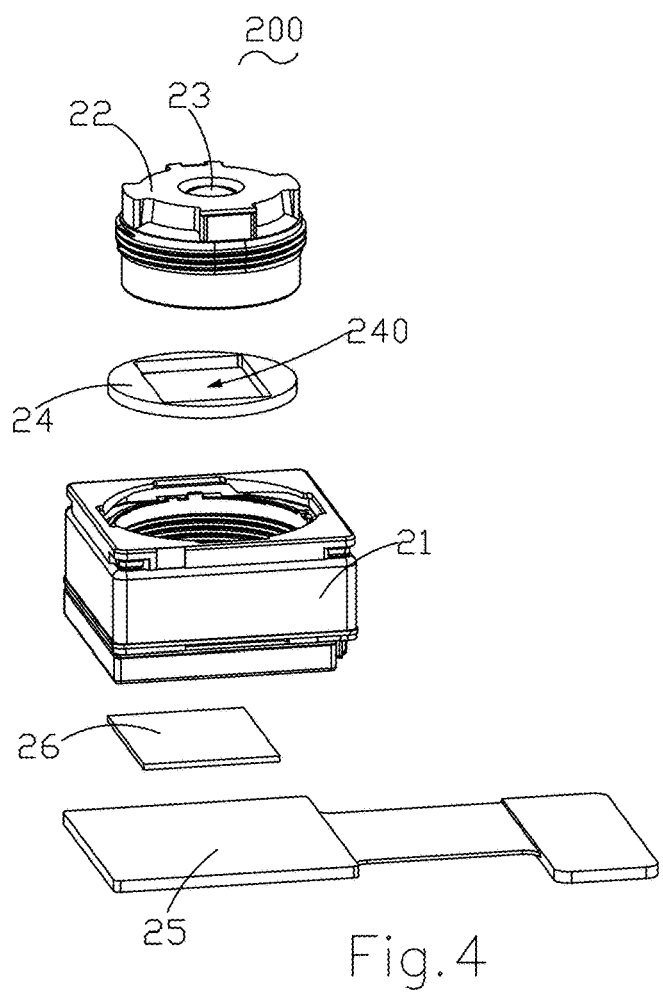
FIG. 4 is an exploded view of the imaging camera in FIG. 3.

Referring to FIGS. 3-4, an imaging camera 200 in accordance with a second exemplary embodiment of the present invention is disclosed. The imaging camera 200 includes a housing 21, a lens holder 22 and a lens unit 23. In the first embodiment, the first hole 1123a has a diameter greater than that of the second hole 1123b, and the aperture 140 of the damping layer 14 has a diameter greater than that of the first hole 1123a. While in the current embodiment, the shoulder hole 2123 includes a first hole 2123a adjacent to the object side and a second hole 2123b adjacent to the image side. A diameter of the second hole 2123b is smaller than that of the first hole 2123a. The imaging camera 200 further includes a filter 26 received in the first hole 2123a. The damping layer 14 abuts against the filter 26 by which the filter 26 provides a force to the damping layer 24. The damping layer 24 forms an aperture 240 facing the lens unit 23, and a diameter of the aperture 240 is smaller than that of the first hole 2123a, by which the stray light is blocked by the damping layer 24. The damping layer 24 is configured to be a circle, and the aperture 240 is configured to be a rectangular. The imaging camera 200 also includes a circuit board 25 mounted on the image side of the housing and abutting against the housing 21.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An imaging camera, including:
   a housing with an accommodation space, and including a supporting part extending toward the accommodation space;
   a lens holder received in the accommodation space of the housing;
   a lens unit received in the lens holder;
   a damping layer located at an image side of the lens holder wherein
   the supporting part is located at the image side of the lens holder, and the lens holder abuts against the supporting part via the damping layer;
   the supporting part includes an object side surface adjacent to the object side of the imaging camera and an image side surface adjacent to the image side of the imaging camera, the object side surface forms a shoulder hole facing the image side, and the damping layer abuts against the object side surface;
   the shoulder hole includes a first hole adjacent to the object side and a second hole adjacent to the image side, a diameter of the first hole is not equal to a diameter of the second hole.

2. The imaging camera as described in claim 1, wherein the diameter of the first hole is smaller than the diameter of the second hole.

3. The imaging camera as described in claim 2, wherein the damping layer forms an aperture facing the lens unit, and a diameter of the aperture is greater than the diameter of the first hole.

4. The imaging camera as described in claim 3, wherein the damping layer is a ring.

5. The imaging camera as described in claim 1, wherein the diameter of the first hole is greater than the diameter of the second hole.

6. The imaging camera as described in claim 5 further including a filter received in the first hole.

7. The imaging camera as described in claim 6, wherein the damping layer abuts against the filter.

8. The imaging camera as described in claim 7, wherein the damping layer forms an aperture facing the lens unit, and a diameter of the aperture is smaller than the diameter of the first hole.

9. The imaging camera as described in claim 1, wherein the damping layer is made of porous sponge with black coating.

* * * * *